US010966277B1

(12) United States Patent
Shukla

(10) Patent No.: US 10,966,277 B1
(45) Date of Patent: Mar. 30, 2021

(54) PREVENTING INSIDER ATTACK IN WIRELESS NETWORKS

(71) Applicant: Amazon Technologies, Inc., Seattle, WA (US)

(72) Inventor: Ashish Kumar Shukla, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/447,673

(22) Filed: Jun. 20, 2019

(51) Int. Cl.
| | | |
|---|---|---|
| *H04W 76/30* | (2018.01) | |
| *H04W 28/06* | (2009.01) | |
| *H04W 72/04* | (2009.01) | |
| *H04B 17/318* | (2015.01) | |
| *H04W 12/00* | (2009.01) | |
| *H04W 12/04* | (2009.01) | |
| *H04W 84/12* | (2009.01) | |

(52) U.S. Cl.
CPC .......... *H04W 76/30* (2018.02); *H04B 17/318* (2015.01); *H04W 12/0017* (2019.01); *H04W 12/04071* (2019.01); *H04W 28/06* (2013.01); *H04W 72/0446* (2013.01); *H04W 84/12* (2013.01)

(58) Field of Classification Search
CPC ........... H04W 76/30; H04W 12/04017; H04W 12/0017; H04W 12/04033; H04W 12/04071; H04W 28/06; H04W 72/04; H04W 72/0446; H04W 84/12; H04B 17/318
See application file for complete search history.

(56) References Cited

U.S. PATENT DOCUMENTS

| | | | |
|---|---|---|---|
| 10,206,166 B2 * | 2/2019 | Karaca ................. | H04W 48/18 |
| 2006/0193284 A1 * | 8/2006 | Stieglitz ................ | H04L 63/107 |
| | | | 370/328 |

(Continued)

OTHER PUBLICATIONS

IEEE Standard for Information Technology—Local and Metropolitan Area Networks—Specific Requirements, 11.3 STA authentication and association, Part 11: Wireless LAN MAC and PHY Specifications, Date of Publication: Dec. 14, 2016.

(Continued)

*Primary Examiner* — Candal Elpenord
(74) *Attorney, Agent, or Firm* — Lowenstein Sandler LLP

(57) ABSTRACT

Technologies for preventing insider attacks in a wireless network are described. A processor of a first device receives a disconnect frame with i) a source address that identifies a wireless access point (WAP) device in a wireless network and ii) a destination address that the disconnect frame is addressed to all devices in the wireless network. The processor sends a frame to the WAP device after expiration of a configurable delay and receives an acknowledgment frame from the WAP device. The processor determines that the disconnect frame is a non-authorized disconnect frame received from a second device and is not to be processed. The processor can increment a first counter value to a second counter value, the second counter value indicating how many times a non-authorized disconnect frame is received at the first device. The processor sends a management frame with the second counter value to the WAP device.

20 Claims, 8 Drawing Sheets

(56) References Cited

U.S. PATENT DOCUMENTS

| | | | |
|---|---|---|---|
| 2006/0200862 A1* | 9/2006 | Olson | H04L 63/1466 726/23 |
| 2006/0251104 A1* | 11/2006 | Koga | H04W 48/20 370/449 |
| 2008/0043686 A1* | 2/2008 | Sperti | H04W 12/1201 370/338 |
| 2008/0052779 A1* | 2/2008 | Sinha | H04L 63/1441 726/22 |
| 2015/0245268 A1* | 8/2015 | Williams | H04W 36/14 370/331 |
| 2016/0366707 A1* | 12/2016 | Sirotkin | H04W 12/003 |
| 2017/0126705 A1* | 5/2017 | Mirashrafi | H04L 63/145 |
| 2017/0244732 A1* | 8/2017 | Manjunath | H04L 63/1416 |
| 2017/0346931 A1* | 11/2017 | Vyas | H04W 76/20 |
| 2018/0124179 A1* | 5/2018 | Kohnke | H04L 69/40 |
| 2020/0007276 A1* | 1/2020 | Kholaif | H04L 1/1621 |
| 2020/0213352 A1* | 7/2020 | Fainberg | H04W 12/1202 |

OTHER PUBLICATIONS

IIEEE Std 802.11-2016 IEEE Standard for Information Technology—Local and Metropolitan Area Networks—Specific Requirements Part 11: Wireless LAN MAC and PHY Specifications, 12.5.4 Broadcast/multicast integrity protocol (BIP), Nov. 2016.

IEEE Std 802.11-2016 IEEE Standard for Information Technology—Local and Metropolitan Area Networks—Specific Requirements Part 11: Wireless LAN MAC and PHY Specifications, 11.3.4.3 Authentication—destination STA, Nov. 2016.

IEEE Std 802.11-2016 IEEE Standard for Information Technology—Local and Metropolitan Area Networks—Specific Requirements Part 11: Wireless LAN MAC and PHY Specifications, 11.3.5.6 Non-AP and non-PCP STA disassociation initiation procedures. Nov. 2016.

IEEE Std 802.11-2016 IEEE Standard for Information Technology—Local and Metropolitan Area Networks—Specific Requirements Part 11: Wireless LAN MAC and PHY Specifications, 4.5.4.8 Fast BSS transition, Nov. 2016.

IEEE Std 802.11-2016 IEEE Standard for Information Technology—Local and Metropolitan Area Networks—Specific Requirements Part 11: Wireless LAN MAC and PHY Specifications, 4.5.4.3 Deauthentication, Nov. 2016.

* cited by examiner

PREVENTING INSIDER ATTACK IN WIRELESS NETWORKS

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

A wireless mesh network may support establishing point-to-point wireless links between the participating communication devices. A network device may utilize the wireless mesh network for accessing digital content stored on one or more digital content servers within or outside of the mesh network.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
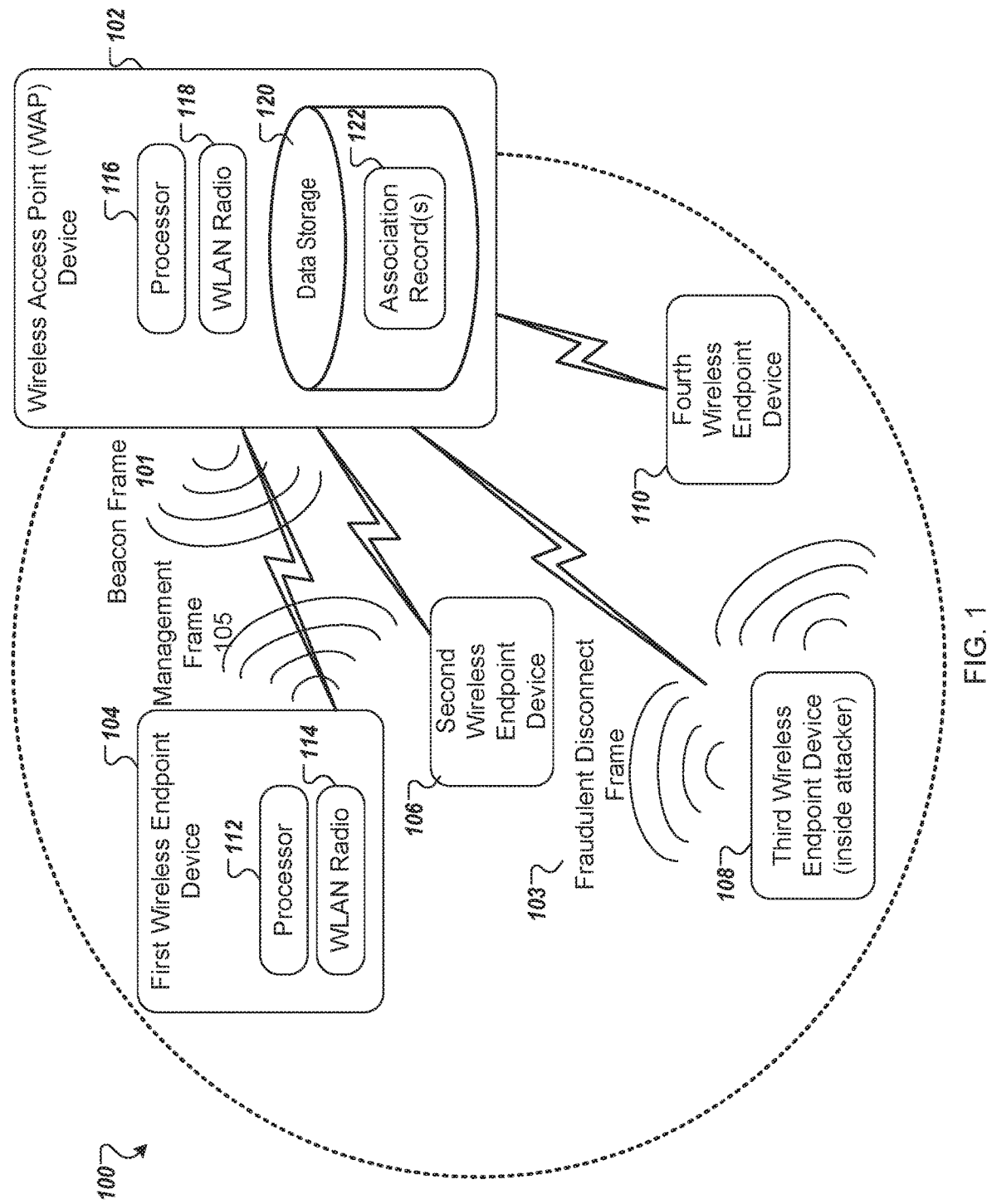
FIG. 1 is a network diagram of a wireless network with a WAP device, multiple wireless endpoint devices one of which is an inside attacker according to one embodiment.

Technologies for preventing insider attacks in a wireless network are described. There is a problem in wireless network security where a wireless device that is part of a wireless network can launch and broadcast a disconnect event, causing all the devices in the network to disconnect from a wireless access point (WAP) improperly. This kind of attack is sometimes called an insider attack or an insider denial of service attack in the wireless network. The Wi-Fi Alliance introduced some security improvements to the Wi-Fi® Protection Access (WPA) standard, called WPA3 or WPA-3. The WPA3 specification does not provide any remedies to this kind of attack. More specifically, IEEE 802.11w, now rolled into IEEE 802.11-2016 standard, introduced protection of Management frames that are being used to signal network activities e.g., disconnect events. All wireless endpoint devices connected to an Access Point have a common group key (also referred to a broadcast management group key) to decrypt and validate the broadcast management frames. This is done to ensure that an attacker, outside of the wireless network not having knowledge of the common management group key, cannot generate a broadcast deauthentication or a broadcast disassociation frame to disconnect all the wireless endpoint devices in the wireless network. The deauthentication frame and the disassociation frame are management frames used by devices in different authentication or authorization states. The devices of the wireless network can use management frames like these during states or stages of authenticating, associating, de-authenticating, and dissociating devices. For example, once an endpoint device is associated to the WAP device, either the WAP device or the endpoint device can terminate the association at any time by sending a disassociation frame. The WAP device or the endpoint device can send a deauthentication frame when all communications are terminated between the devices. The endpoint device can send a disassociation frame when leaving the WAP device to roam to another WAP device. The WAP device can send the disassociation frame when the endpoint device is trying to use invalid parameters. The disassociation or deauthentication frames are Class 3 frames that are used when a station has been successfully authenticated and associated with an access point. Class 3 corresponds to State 3 where the device is authenticated and associated. Class 2 corresponds to State 2 where the device is authenticated but not yet associated. Class 1 corresponds to State 1 where the device is not authenticated and not associated. It can be said that once a station has reached State 3, it is allowed to use distribution servers and reach destinations beyond its access point. If an access point receives frames from a station that is authenticated but not associated, the access point responds with a Disassociation frame to bump the station back to State 2. If the station is not even authenticated, the access point responds with a Deauthentication frame to force the station back into State 1. Disassociation frames are used to end an association relationship between a device and an AP and Deauthentication frames are used to end an authentication relationship between a device and an AP. Both frames include a MAC header, a payload, and a frame check sequence (FCS). The MAC header can include frame control, duration, address information, BSS ID, and sequence-control fields. The payload of the frame can include a reason code field.

The Wi-Fi alliance WPA-3 certification mandates support for protected management frames. However, the problem of a wireless device that is already part of the same network sending a broadcast disconnect frame still exists and is currently not addressed by the WPA-3 certification. Similarly, the IEEE 802.11-2016 standard currently does address this type of attack. Basically, a wireless device in the wireless network can use the common group key to construct a deauthentication frame that looks like as if it came from the AP, causing all wireless devices in the same wireless network to disconnect from the AP, causing an insider denial of service attack. Therefore, the insider attack by a wireless device that is part of the same network, is still possible and not addressed today.

Aspects of the present disclosure address the above and other deficiencies by providing mechanisms to detect this kind of insider attack, maintaining existing wireless connections between the other endpoint devices and the AP. The embodiments described herein can also notify the AP that an attacking device (also referred to as a rough device) is attempting an attack so that the AP can isolate the attacking device to prevent network service disruptions. In one embodiment, a processor of a wireless endpoint device receives a disconnect frame with i) a source address that identifies a WAP device in a wireless network and ii) a destination address that the disconnect frame is addressed to all devices in the wireless network. The disconnect frame can be a first frame including a command to disconnect the first wireless endpoint device from a wireless network. The processor sends a second frame to the WAP device after expiration of a configurable delay and receives an acknowledgment frame from the WAP device response to the second frame. The processor determines that the command to disconnect the first device from the wireless network is not received within a duration of time after sending the second frame to the WAP device. The processor can determine that the first frame originates from a second device that is not authorized to send the first frame, even though the second device is part of the wireless network. The processor can discard the non-authorized disconnect frame as described herein. The processor can increment a first counter value to a second counter value, the second counter value indicating how many times a non-authorized disconnect frame including the command to disconnect is received at the first wireless endpoint from any device that is not authorized to send the command. The processor sends a management frame with the second counter value to the WAP device. The processor also maintains connection with the wireless network via the WAP device.

FIG. 1 is a network diagram of a wireless network 100 with a WAP device 102, multiple wireless endpoint devices 104-110, one of which is an inside attacker 108 according to one embodiment. The WAP device 102 creates the wireless network 100 (e.g., a WLAN) and provides access to the multiple wireless endpoint devices 104-110. The WAP device 102 can be coupled to other devices, such as a gateway, a modem, or the like, that provides access to a private network or a public network, such as the Internet. The WAP device 102 includes a processor 116, a wireless local area network (WLAN) radio 118, and data storage 120. The processor 116 can send beacons via the WLAN radio 118 to identify the wireless network 100 and the service set available to those devices that connect to the WAP device 102. In this embodiment, the multiple wireless endpoint devices 104-110 are connected to the WAP device 102 and are already part of the wireless network 100. The WAP device 102 can store an association record 122 for each of the wireless endpoint devices connected to the WAP device 102. Each of the wireless endpoint devices 104-110 can include a processor and a WLAN radio. For example, as illustrated in FIG. 1, the first wireless endpoint device 104 includes a processor 112 and a WLAN radio 114.

The WAP device 102 can share a common group key with the multiple wireless endpoint devices 104-100. The common group key can be used for broadcast management frames. One type of management frame is a disconnect frame. The WAP device 102 can send a broadcast disconnect frame to disconnect all wireless endpoint devices 104-110 from the wireless network 100. The broadcast disconnect frame can be a deauthentication frame or a disassociation frame. When the WAP device 102 sends a broadcast disconnect frame, the broadcast disconnect frame is addressed to all wireless devices in the wireless network. For example, a receiver address specified in the broadcast disconnect frame is set to FF:FF:FF:FF:FF:FF. A wireless device receiving a frame with the receiver address set to this value can determine that the frame was broadcast to all devices in the wireless network. For example, when the processor 112 of the first wireless endpoint device 104 receives the broadcast disconnect frame from the WAP device 102, the processor 112 can confirm the receiver address as being set to FF:FF:FF:FF:FF:FF and a source address is that of the WAP device 102. The source address can be a MAC address of the WAP device 102 (illustrated as SA: AP). Because the first wireless device 104 includes the common group key, the processor 112 can confirm that the broadcast disconnect frame originates from the WAP device 102 and can disconnect from the WAP device 102 as a result.

The third wireless endpoint device 108, also referred to in this illustrated embodiment, is an inside attacker. The third wireless endpoint device 108 can be considered an inside attacker because the third wireless endpoint device 108 is part of the wireless network 100 and the first wireless endpoint device 104 includes the common group key shared by the WAP device 102. An outside attack, on the other hand, can be performed by a device that is not part of the wireless network 100. The insider attack, by the third wireless endpoint device 108, is only possible with broadcast disconnect frames. For an insider attack, the third wireless endpoint device 108 can send a broadcast disconnect frame 103 with a source MAC address with a spoofed addressed of the WAP device 102, even though the broadcast disconnect frame 103 originates from the third wireless endpoint device 108.

Currently, upon receiving the broadcast disconnect frame 103, the first wireless endpoint device 104 (and the other wireless endpoint devices 106, 110) can validate an integrity of the broadcast disconnect frame 103, such as using frame FCS and Group Key integrity/encryption). When validated as originated from the WAP device 102, the first wireless endpoint device 104 disconnect events from the WAP device 102 (i.e., disconnect events from the wireless network 100). Similarly, all wireless endpoint devices 104, 106, and 110 disconnect from wireless network 100, even though the source address is spoofed by the third wireless endpoint device 108. Additional details of this scenario are illustrated and described in the example of FIG. 2.

In the embodiments of FIG. 1, the first wireless endpoint device 104, the second wireless endpoint device 106, and the fourth wireless endpoint device 110 are configured to handle disconnect frames, while preventing an insider attack. The WAP device 102 can also be configured to handle disconnect frames, while preventing the insider attack. Additional details of multiple scenarios are illustrated and described in the example of FIG. 4-5.

The embodiments described below with respect to FIG. 1 include a combination of techniques for the wireless endpoint devices 104, 106, and 110 to address the insider attack by the third wireless endpoint device 108. The embodiments described below with respect to FIG. 1 also enable the WAP device 102 to isolate and disconnect the inside attacker (third wireless endpoint device 108) from the wireless network 100.

In one embodiment, the processor 112 of wireless endpoint device 104 receives a beacon frame 101 from the WAP device 102 via the WLAN radio 114. The beacon frame 101 includes first data indicating that the WAP device 102 will not use a broadcast disconnect frame to disconnect devices from the wireless network 100. Alternatively, the beacon frame 101 can include first data indicating that the WAP device 102 only uses an encrypted unicast disconnect frame to disconnect devices from the wireless network 100. It should be noted that the first wireless endpoint device 104 and the WAP device 102 can be part of a WLAN. In one embodiment, the first data is stored in a subfield of an element in the beacon frame 101. For example, the element can include an information field with vendor-specific content, as illustrated and described below with respect to FIG. 3. Alternatively, the element can be an Extended Capabilities Information Element the beacon frame 101 as specified in various WLAN specifications. In other embodiments, processor 112 receives a probe response frame with the first data.

The third wireless endpoint device 108 sends a broadcast disconnect frame 103. The broadcast disconnect frame 103 includes: i) a source address of the WAP device 102 as a spoofed source address, instead of an actual address of the third wireless endpoint device 108; and ii) a destination address (also referred to as receiver address) that identifies that the broadcast disconnect frame 103 is addressed to all wireless endpoint devices in the WLAN (or other wireless network). The third wireless endpoint device 108 is part of the WLAN. The broadcast disconnect frame 103 is used to disconnect each wireless endpoint devices in the WLAN from the WLAN. The destination address can include a placeholder address or a specialized single address, such as FF:FF:FF:FF:FF:FF, reserved for broadcast frames. Since the first wireless endpoint device 104, the second wireless endpoint device 106, and the fourth wireless endpoint device 110 are part of the wireless network 100, all of these devices receive the broadcast disconnect frame 103 from the third wireless endpoint device 108. In particular, the processor 112 receives the broadcast disconnect frame 103 from the third wireless endpoint device 108 via the WLAN radio 114. When the processor 112 starts to process the broadcast disconnect frame 103, the processor 112 does not necessarily know that the broadcast disconnect frame 103 originates from the third wireless endpoint device 108. As noted above, when the processor 112 processes the broadcast disconnect frame 103 specifies the source address as the WAP device 102. The processor 112 determines, based on the first data, that the broadcast disconnect frame 103 originates from a device that is not authorized to send the broadcast disconnect frame 103. When the broadcast disconnect frame 103 originates from a device that is not authorized it can be considered unauthorized, malicious, fraudulent, or the like, and the processor 112 should discard the broadcast disconnect frame 103. To discard the frame, as used herein, means that the frame is ignored, not processed, deleted, or otherwise so that the processor 112 does not disconnect the first wireless endpoint device 104 from the WLAN as a result of the broadcast disconnect frame 103. In other words, the processor 112 determines that the broadcast disconnect frame 103 can be discarded and maintains connection with the WLAN via the WAP device 102 as a result of the determination that the broadcast disconnect frame 103 originates from a device that is not authorized to send the broadcast disconnect frame 103 to disconnect the first wireless endpoint device 104 from the WLAN. In one embodiment, the processor 112 determines that the third wireless endpoint device 108 is an inside attacker by checking that the WAP device 102 advertises that the WAP device 102 will only use an encrypted unicast disconnect frame to disconnect a device from the wireless network 100 or that the WAP device 102 will not use a broadcast disconnect frame to disconnect a device from the wireless network 100. Alternatively, the wireless endpoint device can confirm whether the broadcast disconnect frame is authorized in a manner that cannot be spoofed by the third wireless endpoint device 108.

The processor 112, in response to determining that the third wireless endpoint device 108 is not an authorized device to send the broadcast disconnect frame 103 (or other disconnect frame), increments a counter from a first value to a second value. The counter tracks how many times a broadcast disconnect frame is received by the first wireless endpoint device 104 from a device that is not authorized to send the broadcast disconnect frame. The non-authorized device (i.e., a device that is not authorized to send the broadcast disconnect frame) can be any wireless endpoint device that is not the WAP device 102, since the WAP device 102 has already advertised that it will not send broadcast disconnect frames. After incrementing the counter to the second value, the processor 112 sends a management frame 105 to the WAP device 102 via the WLAN radio 114. The processor 112 can send the management frame 105 responsive to receiving first data in the beacon frame or probe response frame. The management frame 105 can include second data indicating that the counter has the second value. The second data can be stored in a first subfield of an element in the management frame 105. A second subfield of the element in the management frame 105 can include third data indicating that the wireless endpoint device 104 has a capability to discard the broadcast disconnect frame 103 when the WAP device 102 advertises in the beacon frame 101 the first data indicating that the WAP device 102 will not use a broadcast disconnect frame to disconnect devices from the wireless network 100. The element in the beacon frame 101 can be a vendor element or an Extended Capabilities Information Element. Similarly, the element in the management frame 405 can be a vendor element or an Extended Capabilities Information Element.

In a further embodiment, the processor 112 sends a null frame to the WAP device 102 after expiration of a configurable delay. The configurable delay corresponds to an amount of time that allows the WAP device 102 to clear an association record 122 for the first wireless endpoint device 104. In another embodiment, the processor 112 sends a data frame to the WAP device 102 after expiration of the configurable delay. When the WAP device 102 intends to disconnect the first wireless endpoint device 104, the WAP device 102 sends an encrypted unicast disconnect frame to confirm the intent to disconnect the first wireless endpoint device 104. In response, the processor 112 receives the encrypted unicast disconnect frame and decrypts the encrypted unicast disconnect frame with an encryption key shared between the WAP device 102 and the first wireless endpoint device 104. The WAP device 102 can share a common group key with each of the wireless endpoint devices and can share an individual device key with each of the wireless endpoint devices. Since the third wireless endpoint device 108 does not include the encryption key for the first wireless endpoint device 104, the communications between the first wireless endpoint device 104 and the WAP device 102 cannot be spoofed. That is, the third wireless endpoint device 108 cannot send an encrypted unicast disconnect frame directly to the first wireless endpoint device 104. The first wireless endpoint device 104, in response to the decrypting the encrypted unicast disconnect frame, the first wireless endpoint device 104 disconnect events from the wireless network 100.

In another embodiment, the processor 112 receives a second broadcast disconnect frame via the WLAN radio. The second broadcast disconnect frame includes a source address that identifies the WAP device and a destination address that identifies that the second broadcast disconnect frame is addressed to all wireless endpoint devices in the WLAN. Responsive to receiving the second broadcast disconnect frame, the processor 112 sends, responsive to receiving the second broadcast disconnect frame, a first frame to the WAP device after expiration of a configurable delay and while in an authorized state in which the wireless endpoint device is connected to the WLAN via the WAP device, wherein the configurable delay corresponds to an amount of time that allows the WAP device to clear an association record for the wireless endpoint device. The association record can include third data that identifies the wireless endpoint device as being in the authorized state. When a device is disconnected from the WLAN, the WAP device can remove, delete, discard, or otherwise clear the association record in a database of the WAP device. When there is no association record in the database, the WAP device will treat any frames from this device in a specific manner as set forth in the wireless standard. For example, if there is no association record for a device and the WAP device receives a data frame or null frame from the device, the WAP device is required to send a unicast disconnect frame to the device. After the configurable delay in which the association record is cleared, the processor 112 receives an encrypted unicast disconnect frame from the WAP device and decrypts the encrypted unicast disconnect frame with an encryption key shared only between the WAP device and the wireless endpoint device. The processor 112 disconnects the wireless endpoint device from the WLAN.

In contrast, responsive to receiving the broadcast disconnect frame (not the second broadcast frame), the processor sends a second frame to the WAP device after expiration of the configurable delay. The processor 112 receives an acknowledgment frame from the WAP device responsive to the second frame and confirms that the broadcast disconnect frame originates from the device that is not authorized to send the broadcast disconnect frame responsive to determining that no encrypted unicast disconnect frame is received from the WAP device within a second amount of time after sending the second frame to the WAP device.

In another embodiment, the processor 112 sends at least one of a data frame or a null frame to the WAP device 102 after expiration of a configurable delay. As noted above, the configurable delay corresponds to an amount of time that allows the WAP device 102 to clear an association record 122 for the first wireless endpoint device 104. When the WAP device 102 did not intend to disconnect the first wireless endpoint device 104, the WAP device 102 sends an acknowledgment frame and the processor 112 receives the acknowledgment frame from the WAP device 102. The processor 112 confirms that the broadcast disconnect frame 403 is received from the non-authorized device (i.e., a device that is not authorized to send the broadcast disconnect frame) and is not to be processed (i.e., discarded by the first wireless endpoint device 104). The acknowledgement frame can be used to determine that the broadcast disconnect frame 103 is fraudulent or malicious. In some cases, it is the absence of a unicast disconnect message being sent in response to the processor 112 sending the data frame or null frame to confirm the broadcast disconnect frame 103.

In another embodiment, the processor 112 starts a timer with a timeout at an end of the duration of time, responsive to sending the second frame to the WAP device 102. The processor 112 determines that the command to disconnect the first device from the wireless network is not received before the timeout. The processor determines that the first frame originates from the second device that is not authorized to send the first frame responsive to determining that the command is not received before the timeout. As a result, the processor 112 maintains connection with the WAP device 102.

In another embodiment, the processor 112 starts a timer with a timeout at an end of the duration of time, responsive to sending the second frame to the WAP device 102. The processor 112 receives, before the end of the duration of time, a third frame including the command to disconnect the first device from the wireless. The third frame is a unicast frame including a source address that identifies the WAP device 102. The processor 112 determines that the third frame originates from the WAP device 102 that is authorized to send the third frame including the command to disconnect. As a result, the processor 112 disconnects connection with the WAP device 102. In one embodiment, the third frame is an encrypted frame and the processor 112 determines that the third frame originates from the WAP device 102 by decrypting the encrypted frame using a key shared only between the WAP device and the first device. In another embodiment, the first frame is encrypted with a first key shared between the WAP device 102 and two or more devices that are part of the wireless network and the third frame is encrypted with a second key shared only between the WAP device 102 and the first device. This first key can be considered a group key. The group key can be shared with all devices in the wireless network. In other embodiments, the group key can be specified for a subset of all devices in the wireless network, such as done with multi-cast frames.

Although illustrated and described as a WAP device 102 and wireless endpoint devices, in other embodiments, a mesh network device can be used. For example, the mesh network device can be a mesh station that connects to other mesh network device and/or client consumption devices. In these embodiments, the mesh station can be configured with the capabilities of the WAP device 102 as described herein.

As noted above, the current WLAN protocols are susceptible to inside attacks when the inside attacker spoofs the source address in a broadcast disconnect frame. The insider attack can force all devices to get disconnected fraudulently as set forth below with respect to FIG. 2.

Figure 2:
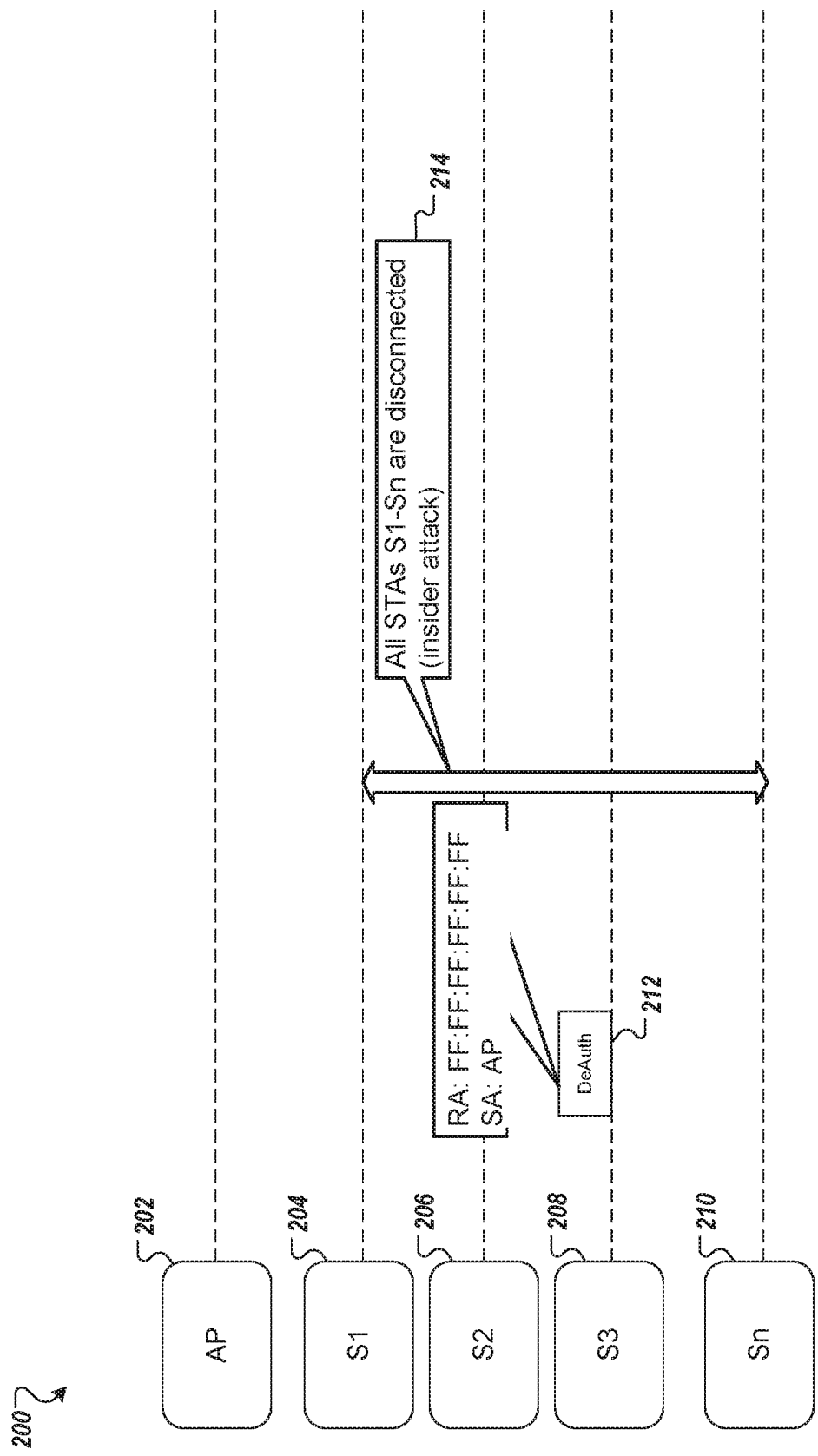
FIG. 2 is a sequence diagram illustrating an inside attacker forcing all wireless endpoint devices to disconnect from a WAP device according to one embodiment.

FIG. 2 is a sequence diagram 200 illustrating an inside attacker forcing all wireless endpoint devices to disconnect from a WAP device according to one embodiment. In the sequence diagram 200, a third wireless endpoint device 208 (labeled as S3) sends a De-Authentication frame 212 (or disassociation frame). The De-Authentication frame 212 is addressed to all the wireless endpoint devices by the receiver address being set to FF:FF:FF:FF:FF:FF. The third wireless endpoint device 208, the inside attacker, fraudulently sets the source address as a source address of a WAP device 202 (labeled as "SA: AP"). The source address can be the WAP device's MAC address. This is done to make a receiver operate as if the De-Authentication frame 212 originated from the WAP device 202. Currently, the inside attack is only possible with broadcast disconnect events frames.

Upon receiving the De-Authentication frame 212, the first wireless endpoint device 204, a second wireless endpoint device 206, and a fourth wireless endpoint device 210 are disconnected 214 from a wireless network and the WAP device 202. In contrast, upon receiving a similar De-Authentication frame as the De-Authentication frame 212, the first wireless endpoint device 104, the second wireless endpoint device 106, and the fourth wireless endpoint device 110 of FIG. 1 can maintain connectivity with the WAP device 102, ignoring the De-Authentication frame since it is sent as a broadcast disconnect frame that is addressed to all devices. The first wireless endpoint device 104, the second wireless endpoint device 106, and the fourth wireless endpoint device 110 of FIG. 1 can know that the WAP device 102 has a capability to use an encrypted unicast disconnect frame to disconnect a wireless device from the wireless network, such as illustrated and described below with respect to FIG. 3.

Figure 3:
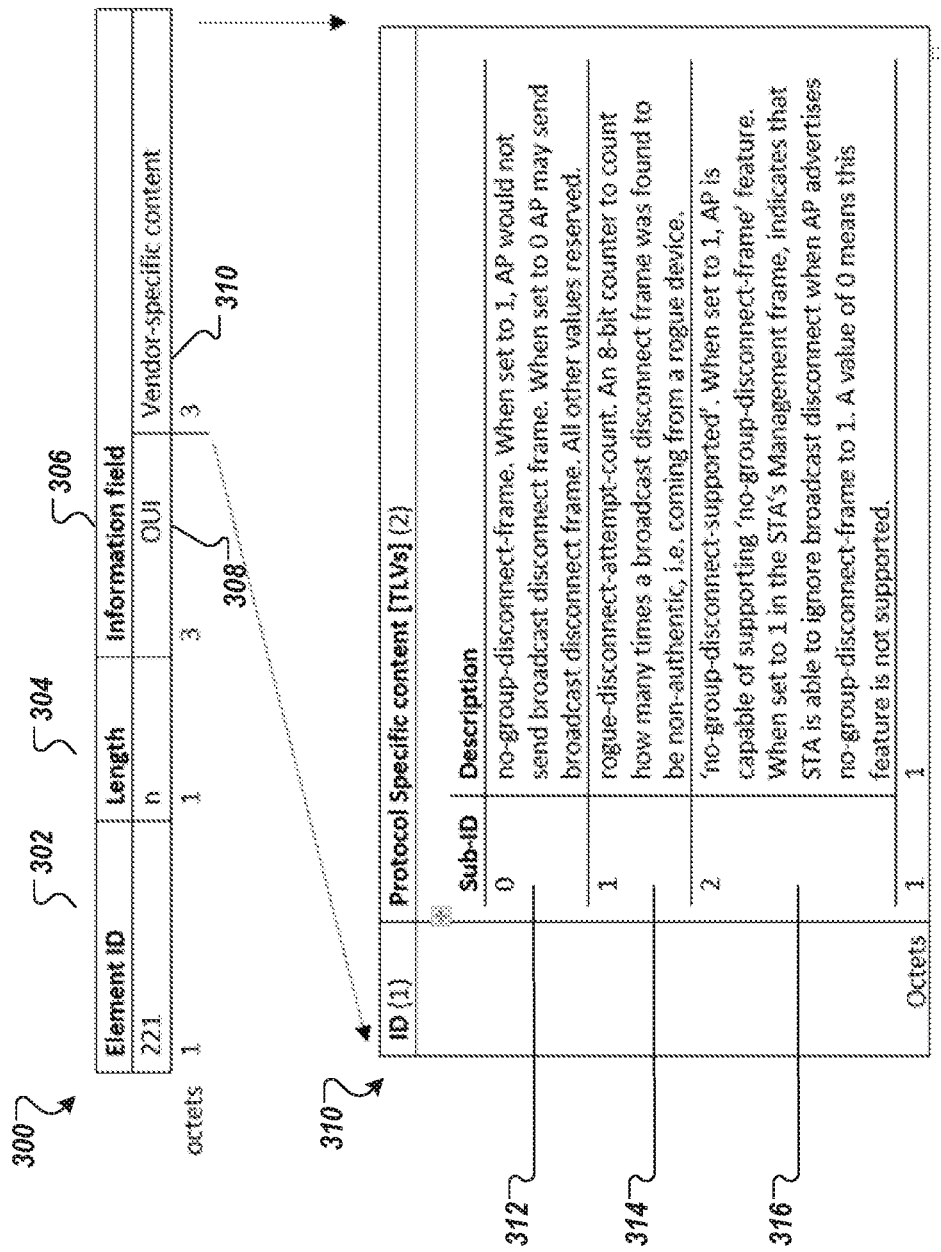
FIG. 3 illustrates an example information element 300 with an information field with multiple subfields according to one embodiment.

FIG. 3 illustrates an example information element 300 with an information field with multiple subfields according to one embodiment. The information element 300 includes an element identifier (ID) 302, a length 304, and an information field 306. Within the information field 306 includes an organization unique identifier (OUI) 308 and vendor-specific content 310. As illustrated in the exploded view of the vendor-specific content 310, the vendor-specific content 310 includes a first subfield 312, a second subfield 314, and a third subfield 316. The first subfield 312 can include a type-length-value (TLV) structure with a sub-ID of "no-group-disconnect-frame" and a value corresponding to following description: when the no-group-disconnect-frame is set to 1, the WAP 102 would not send a broadcast disconnect frame. When the no-group-disconnect-frame is set to 0, the WAP device 102 may send a broadcast disconnect frame. All other values of the first subfield 312, if any, can be reserved for other purposes. The second subfield 314 can include TLV structure with a sub-ID of "rouge-disconnect-attempt-count" and a value corresponding to a counter (e.g., 8-bit counter) to count how many times a broadcast disconnect frame was found to be non-authorized, i.e., coming from a rogue device (inside attacker). The third subfield 316 can include TLV structure with a sub-ID of "no-group-disconnect-supported" and a value corresponding to following description: when the no-group-disconnect-supported is set to 1, the WAP 102 has a capability to support the "no-group-disconnect-frame" feature. When the no-group-disconnect-supported is set to 0, the WAP device 102 does not have the capability to support the "no-group-disconnect-frame" feature. All other values of the third subfield 316, if any, can be reserved for other purposes.

In some embodiments, the wireless endpoint devices can use the information element 300 in a management frame. In the management frame, the wireless endpoint device can set the rogue-disconnect-attempt count with a count of how many times a broadcast frame was found to be non-authorized. The wireless endpoint can also set the no-group-disconnect-supported to a 1 to indicate that the wireless endpoint device has a capability to discard a broadcast disconnect frame when the WAP device 102 advertises the no-group-disconnect-frame (first subfield 312) in the beacon frame, for example.

It should be noted that the information element 300 in FIG. 3 can be considered a vendor information element to signal the new behavior. In other embodiments, similar subfields can be used in an Extended Capabilities Information Element. Alternatively, the information in the first subfield 312, the second subfield 314, and the third subfield 316 can be sent as data in management frames, beacon frames, or other control frames.

In another embodiment, an access point (AP) can be configured to not support broadcast deauthentication commands or disassociation commands. When the AP wants to disconnect all devices in its network, it needs to send a unicast disconnect frame (deauthentication, or disassociation) to each one of the devices individually. Note that with WPA-3 it is not possible to generate a valid encrypted unicast disconnect frame by faking or spoofing MAC address part of the individual disconnect frames given different encryption keys for each device (only broadcast key is common). However, even with this scheme, an attacker inside a network can still send a broadcast disconnect frame that would be processed by each device. Therefore, when the AP is configured to not allow broadcast disconnect frame, the wireless endpoint devices need also provisioning to discard broadcast disconnect frames. The ability to detect if a device must discard broadcast disconnect frames, can be advertised inside a vendor element in the AP Beacon frame, once AP is configured to not make use of broadcast disconnect event. Upon receiving a AP Beacon frame from the AP that contains vendor element indicating 'no-group-disconnect-frame' in use, the endpoint devices discard the received broadcast disconnect frames and increment the 'rogue-disconnect-attempt-count' for each received broadcast disconnect frame. To indicate weather AP and endpoint device (also referred to as station or STA) can support this feature, the 'no-group-disconnect-supported' subfields are advertised in the vendor element. When the 'no-group-disconnect-supported' set to 1, the AP is capable of supporting the 'no-group-disconnect-frame' feature. When set to 1 in the STA's Management frame, the subfield indicates that the STA has a capability to discard broadcast disconnect when the AP advertises no-group-disconnect-frame to 1. A value of 0 means this feature is not supported. In some embodiments, the vendor element can follow the vender element definition illustrated in FIG. 3 and can be included in the Beacon frame when the 'no-group-disconnect-frame' option is advertised. Alternatively, the subfields can be communicated in other manners. The 'no-group-disconnect-frame' field may be added into the Extended Capability element, when these features become part of a WLAN standard, such as the IEEE 802.11bc.

Figure 4:
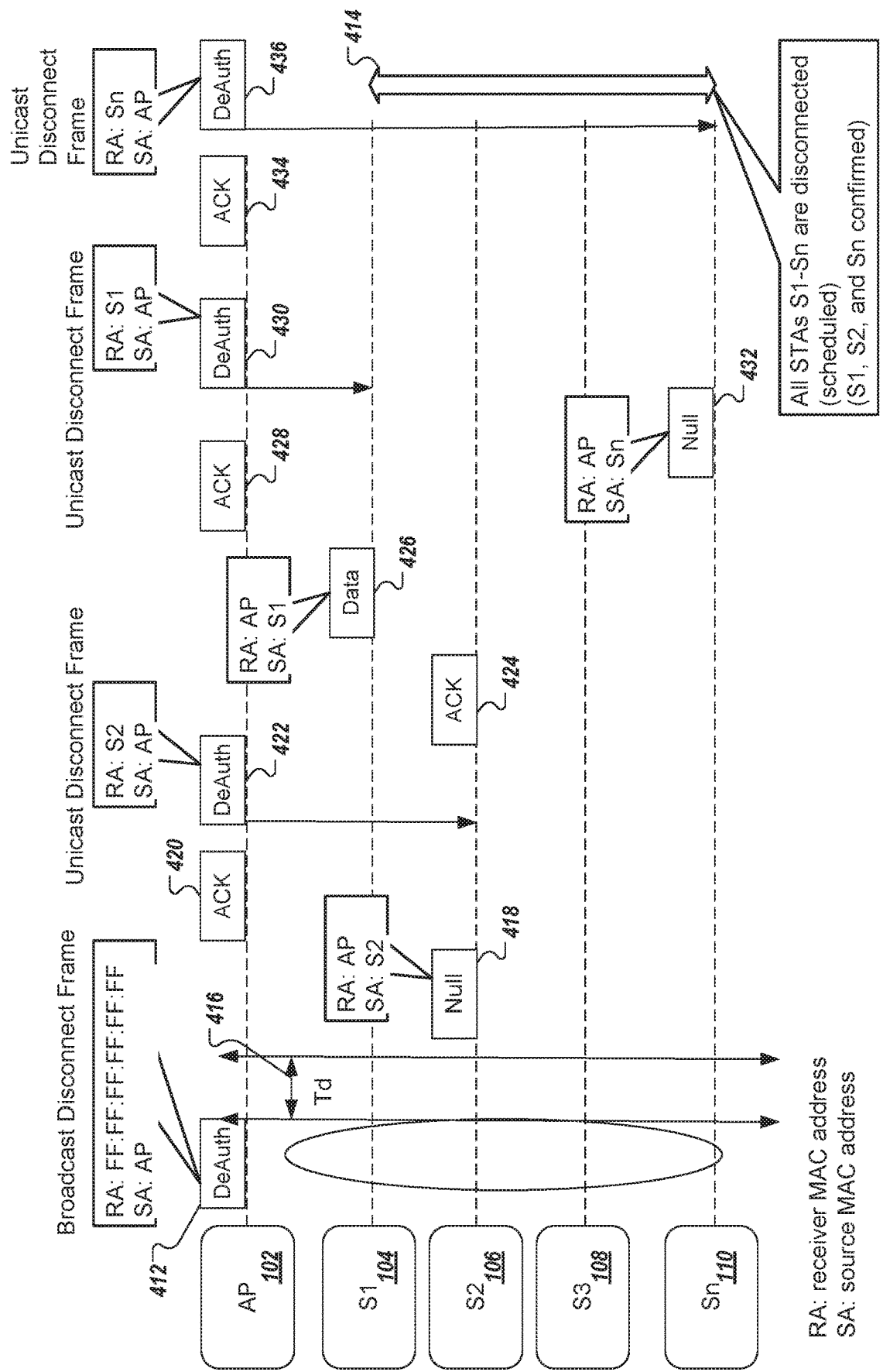
FIG. 4 is a sequence diagram illustrating a WAP device intentionally disconnecting all wireless endpoint devices from the wireless network and some wireless endpoint devices confirming the disconnection according to one embodiment.

FIG. 4 is a sequence diagram 400 illustrating a WAP device intentionally disconnecting all wireless endpoint devices from the wireless network and some wireless endpoint devices confirming the disconnection according to one embodiment. In the sequence diagram 400, the first WAP device 102 sends a De-Authentication frame 412 (or disassociation frame or other broadcast disconnect frame). The De-Authentication frame 412 is addressed to all the wireless endpoint devices by the receiver address being set to FF:FF:FF:FF:FF:FF. Because the WAP device 102 intentionally broadcasts the De-Authentication frame 412, the broadcast is authorized. The wireless endpoint devices can confirm the authorization of a disconnect event. In some cases, a mechanism can be used to validate, verify, or confirm the authorization of the disconnect event. For example, there are cases where the AP's behavior cannot be controlled, cases where the number of devices connected to the AP is large, cases where sending individual deauthentication frames may not be optimal, or cases where the AP needs an instant restart. The following mechanism can be used to confirm the authorization of the disconnect event. As illustrated in FIG. 4, a configurable delay 416 can be added after receiving a broadcast disconnect frame. The configurable delay 416 corresponds to an amount of time that allows the WAP device 102 to clear an association record for the second wireless endpoint device. The WAP device 102 can delete a device association record after sending a disconnect frame. The configurable delay 416 can be less than 100 milliseconds. An endpoint device in the wireless network, upon receiving a broadcast disconnect frame, waits for the expiry of the small configurable delay 416 (Td), which allows the AP to clear the association record for the devices. After the expiry of Td, the wireless endpoint device sends a data frame, if available, to the WAP device 102. If there is no pending data frame to be sent to the WAP device 102, the wireless endpoint device can send a Null frame (no MAC play load or just a header) after expiry of the configurable delay 416 (Td).

Referring back to FIG. 4, upon receiving the deauthentication frame 412, the second wireless endpoint device 106 sends a null frame 418, but after the configurable delay 416 (Td). The WAP device 102 sends an acknowledgement frame 420 in response. Also, because the WAP device 102 had genuinely sent the broadcast disconnect frame (deauthentication frame 412) previously, upon the expiry of the configurable delay 416 (Td), the WAP 102 would not have any association record for the second wireless endpoint device 106. Thus, upon receiving the Null frame 418 (or a data frame) from the second wireless endpoint device 106, the WAP 102 would send a deauthentication frame 422, as a unicast disconnect frame, to the second wireless endpoint device 106—the wireless endpoint device had previously sent the data or Null frame. This is accordance with disconnect rules in WLAN standards where, upon receiving a data or null frame for which there is no valid association record, the WAP 102 is required to reply with a disconnect frame. The second wireless endpoint device 106 receiving the unicast De-Authorization frame 422 from the WAP device 102, in response to the previously sent data or Null frame, gets confirmation of an actual disconnect event. The second wireless endpoint device 106 sends an acknowledgement frame 424.

In a further embodiment, the first wireless endpoint device 104 can send a data frame 426 to the WAP device 102 to confirm the De-authorization frame 412. The first wireless endpoint device 104 sends the data frame 426 after the configurable delay 416 (Td). The WAP device 102 sends an acknowledgement frame 428 in response. Also, because the WAP device 102 had genuinely sent the broadcast disconnect frame (deauthentication frame 412) previously, upon the expiry of the configurable delay 416 (Td), the WAP 102 would not have any association record for the first wireless endpoint device 104. Thus, upon receiving the data frame 426 (or a data frame) from the first wireless endpoint device 104, the WAP 102 would send a deauthentication frame 430, as a unicast disconnect frame, to the first wireless endpoint device 104. Similarly, the fourth wireless endpoint device 110 can send a null frame 432 to the WAP device 102 to confirm the De-authorization frame 412. The fourth wireless endpoint device 110 sends the null frame 432 after the configurable delay 416 (Td). The WAP device 102 sends an acknowledgement frame 434 in response. Also, because the WAP device 102 had genuinely sent the broadcast disconnect frame (deauthentication frame 412) previously, upon the expiry of the configurable delay 416 (Td), the WAP 102 would not have any association record for the fourth wireless endpoint device 110. Thus, upon receiving the null frame 432 (or a data frame) from the fourth wireless endpoint device 410, the WAP 102 would send a deauthentication frame 436, as a unicast disconnect frame, to the fourth wireless endpoint device 110. As a result of the individual confirmations, all of the wireless endpoint devices are disconnected 414 from the wireless network and the WAP device 102.

Figure 5:
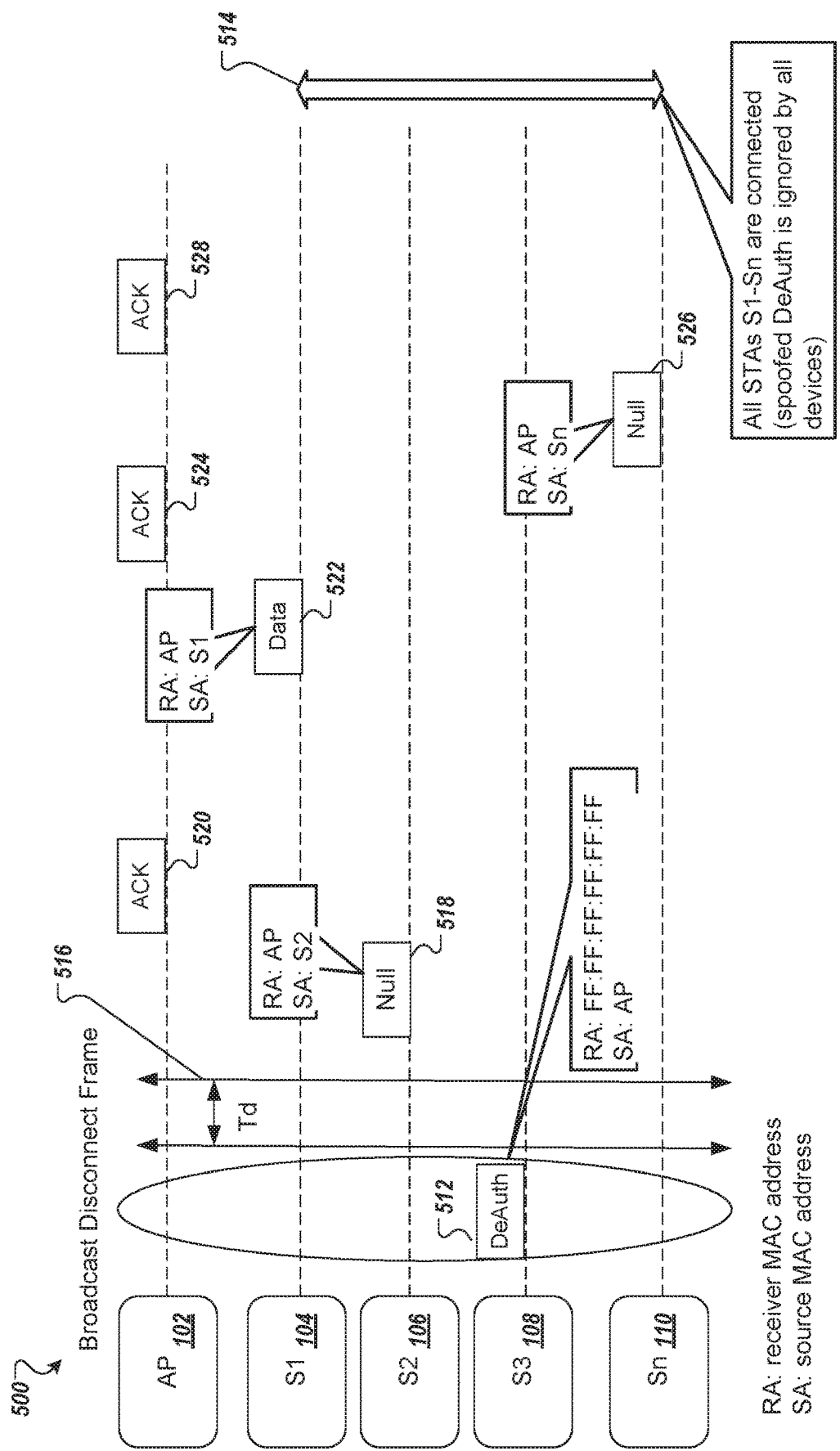
FIG. 5 is a sequence diagram illustrating an insider attacker attempting to force all wireless endpoint devices to disconnect from a WAP device while the wireless endpoint devices maintain connectivity with the WAP device according to one embodiment.

If WAP device 102 had not sent a broadcast disconnect frame before, but it was due to some attacker in the network, upon receiving Data or Null frame from the wireless endpoint device, WAP device 102 would ACK and would not send any disconnect frame, such as illustrated in FIG. 5. It should be noted that the inside attacker may receive data or Null frame from the wireless endpoint devices being attacked, however, the inside attacker cannot send an encrypted unicast disconnect frame back to the wireless endpoint device, given it does not know the encryption key. In this case, all wireless endpoint devices continue connectivity with the WAP device 102 and all the frame exchanges during the confirmation time period are processed as if there is no disconnect event to begin with.

FIG. 5 is a sequence diagram 500 illustrating an insider attacker attempting to force all wireless endpoint devices to disconnect from the WAP device 102 while the wireless endpoint devices maintain connectivity with the WAP device 102 according to one embodiment. In the sequence diagram 500, the third wireless endpoint device 108 (labeled as S3) sends a De-Authentication frame 512 (or disassociation frame). The De-Authentication frame 512 is addressed to all the wireless endpoint devices by the receiver address being set to FF:FF:FF:FF:FF:FF. The third wireless endpoint device 108, the inside attacker, fraudulently sets the source address as a source address of the WAP device 102 (labeled as "SA: AP"). The source address can be the WAP device's MAC address. This is done to make a receiver operate as if the De-Authentication frame 512 originated from the WAP device 102.

Upon receiving the De-Authentication frame 512, the first wireless endpoint device 104, the second wireless endpoint device 106, and the fourth wireless endpoint device 110 are not automatically disconnected from a wireless network and the WAP device 102. Rather, the first wireless endpoint device 104, the second wireless endpoint device 106, and the fourth wireless endpoint device 110 wait for a configurable delay 516. The configurable delay 516 corresponds to an amount of time that allows the WAP device 102 to clear an association record for the wireless endpoint devices. Upon receiving the deauthentication frame 512, the second wireless endpoint device 106 sends a null frame 518, but after the configurable delay 516 (Td). The WAP device 102 sends an acknowledgement frame 520 in response. Because the WAP device 102 did not send the broadcast disconnect frame (deauthentication frame 512), upon the expiry of the configurable delay 516 (Td), the WAP 102 would still have an association record for the second wireless endpoint device 106. Thus, upon receiving the Null frame 518 (or a data frame) from the second wireless endpoint device 106, the WAP 102 would only send the acknowledgement frame 520 and would not send a deauthentication frame back to the second wireless endpoint device 106. Since the second wireless endpoint device 106 does not receive the unicast De-Authorization frame for confirmation, the second wireless endpoint device 106 can confirm that the De-authorization frame 512 is a fraudulent De-Authorization frame from an inside attacker.

In a further embodiment, the first wireless endpoint device 104 can send a data frame 522 to the WAP device 102 to confirm the De-authorization frame 512. The first wireless endpoint device 104 sends the data frame 522 after the configurable delay 516 (Td). The WAP device 102 sends an acknowledgement frame 524 in response. Because the WAP device 102 did not send the broadcast disconnect frame (deauthentication frame 512) previously, upon the expiry of the configurable delay 516 (Td), the WAP 102 would still have an association record for the first wireless endpoint device 104. Thus, upon receiving the data frame 522 (or a null frame) from the first wireless endpoint device 104, the WAP 102 would only send the acknowledgement frame 524 back the first wireless endpoint device 104 and would not send a unicast disconnect frame. Similarly, the fourth wireless endpoint device 110 can send a null frame 526 to the WAP device 102 to confirm the De-authorization frame 512. The fourth wireless endpoint device 110 sends the null frame 526 after the configurable delay 516 (Td). The WAP device 102 sends an acknowledgement frame 528 in response. Also, because the WAP device 102 did not send the broadcast disconnect frame (deauthentication frame 512) previously, upon the expiry of the configurable delay 516 (Td), the WAP 102 would still have an association record for the fourth wireless endpoint device 110. Thus, upon receiving the null frame 526 (or a data frame) from the fourth wireless endpoint device 432, the WAP 102 would only send the acknowledgment frame 528 and would not send a unicast deauthentication frame to the fourth wireless endpoint device 110. As a result of the individual confirmations, all of the wireless endpoint devices are disconnected 414 from the wireless network and the WAP device 102. Since the first wireless endpoint device 104 and the fourth wireless endpoint device 110 do not receive the unicast De-Authorization frame for confirmation, the first wireless endpoint device 104 and the second wireless endpoint device 110 can confirm that the De-authorization frame 512 is a fraudulent De-Authorization frame from an inside attacker. As a result of the individual confirmations, the first, second, and fourth wireless endpoint devices remain connected 514 with the WAP device 102.

In other embodiments, a wireless endpoint device, upon seeing repeated broadcast disconnect events that were found to be false disconnect events, may choose to discard the near future broadcast disconnect events as long as Receive Signal Strength Indicator (RSSI) values of the received broadcast disconnect remains similar, representing the same source attacking periodically. For example, a processor of a wireless endpoint device determines that a number of fraudulent disconnect frames have been received within a configurable amount of time prior to receiving the disconnect frame. The number can represent the repeated broadcast disconnect events that were found to be false disconnect events. The processor determines that a RSSI value measured for the disconnect frame is the same as or is within a range of RSSI values measured for each of the number of non-authorized disconnect frames. Alternatively, the processor can determine that the RSSI value is within a configurable range of RSSI values from the number of non-authorized disconnect frames. It should be noted that an attacker can change transmit power to vary RSSI values. However, even in that case, if a wireless endpoint device discards the broadcast disconnect frame based on RSSI, the disconnect frame can be confirmed by the AP when the AP was the device that sent the broadcast disconnect frame previously.

Figure 6:
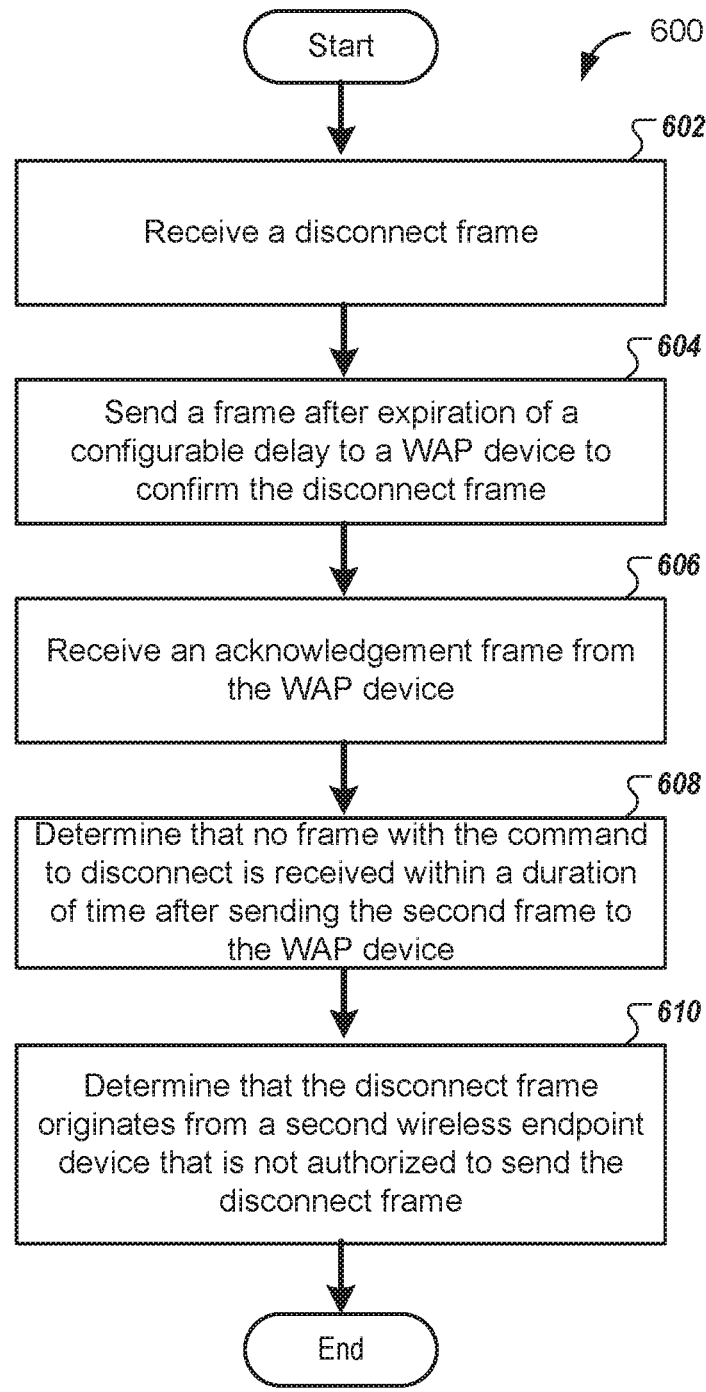
FIG. 6 is a flow diagram illustrating a method of handling a disconnect frame at a wireless endpoint device according to an embodiment.

FIG. 6 is a flow diagram illustrating a method 600 of handling a disconnect frame at a wireless endpoint device according to an embodiment. The method 600 may be performed by processing logic that comprises hardware (e.g., circuitry, dedicated logic, programmable logic, microcode, etc.), software, firmware, or a combination thereof. In one embodiment, method 600 may be performed by any of the wireless devices described herein and illustrated with respect to FIG. 1, 4, or 5.

Referring to FIG. 6, the method 600 begins by the processing logic receiving a disconnect frame (block 602). The disconnect frame can be a first frame including a command to disconnect the first device from a wireless network. The disconnect frame includes: i) a source address that identifies a WAP device in the wireless network; and ii) a destination address that identifies that the disconnect frame is addressed to all devices in the wireless network. The processing logic sends a second frame to the WAP device after expiration of a configurable delay to confirm the disconnect frame (block 604). The processing logic receives an acknowledgment frame from the WAP device (block 606), responsive to the second frame. The processing logic determines that the command to disconnect the first device from the wireless network is not received within a duration of time after sending the second frame to the WAP device (block 608). The processing logic determines that the disconnect frame originates from a second wireless endpoint device that is not authorized to send the disconnect frame (block 608), and the method 600 ends.

In a further embodiment, the processing logic increments a first counter value to a second counter value. The second counter value indicates how many times a non-authorized disconnect frame is received at the first wireless endpoint device. The processing logic sends a management frame to the WAP device. The management frame includes the second counter value. The second counter value can be used by the WAP device to isolate and disconnect the inside attacker. In one embodiment, the processing logic sends the management frame with the second counter value in a vendor element in the management frame. In another embodiment, the processing logic sends the management frame with the second counter value in an Extended Capabilities Information Element in the management frame.

In another embodiment, the processing logic receives a beacon frame from the WAP device prior to receiving the disconnect frame. The beacon frame includes first data indicating that the WAP device only uses an encrypted unicast disconnect frame to disconnect the first wireless endpoint device from the wireless network. In one embodiment, the management frame includes second data indicating that the first wireless endpoint device has a capability to discard a disconnect frame when the WAP device advertises the first data in the beacon frame. In another embodiment, the processing logic receives the beacon frame with the first data in a vendor element in the beacon frame. In another embodiment, the processing logic receives the beacon frame with the first data in an Extended Capabilities Information Element in the beacon frame.

In another embodiment, the processing logic receives a second disconnect frame. The second disconnect frame is encrypted by an encryption key shared between the WAP device and the first wireless endpoint device. The processing logic decrypts the second disconnect frame using the encryption key and disconnects from the WAP device.

In another embodiment, the disconnect frame is at least one of a broadcast deauthentication frame of a broadcast disassociation frame. In a further embodiment, the disconnect frame includes a source address that identifies the WAP device instead of the second wireless endpoint device. The disconnect frame also includes a destination address that the broadcast disconnect frame is addressed to all wireless devices in the wireless network.

In another embodiment, the processing logic determines that a number of non-authorized disconnect frames have been received within a configurable amount of time prior to receiving the disconnect frame. The processing logic determines that a RSSI value of the disconnect frame is the same as RSSI values from the number of non-authorized disconnect frame.

Figure 7:
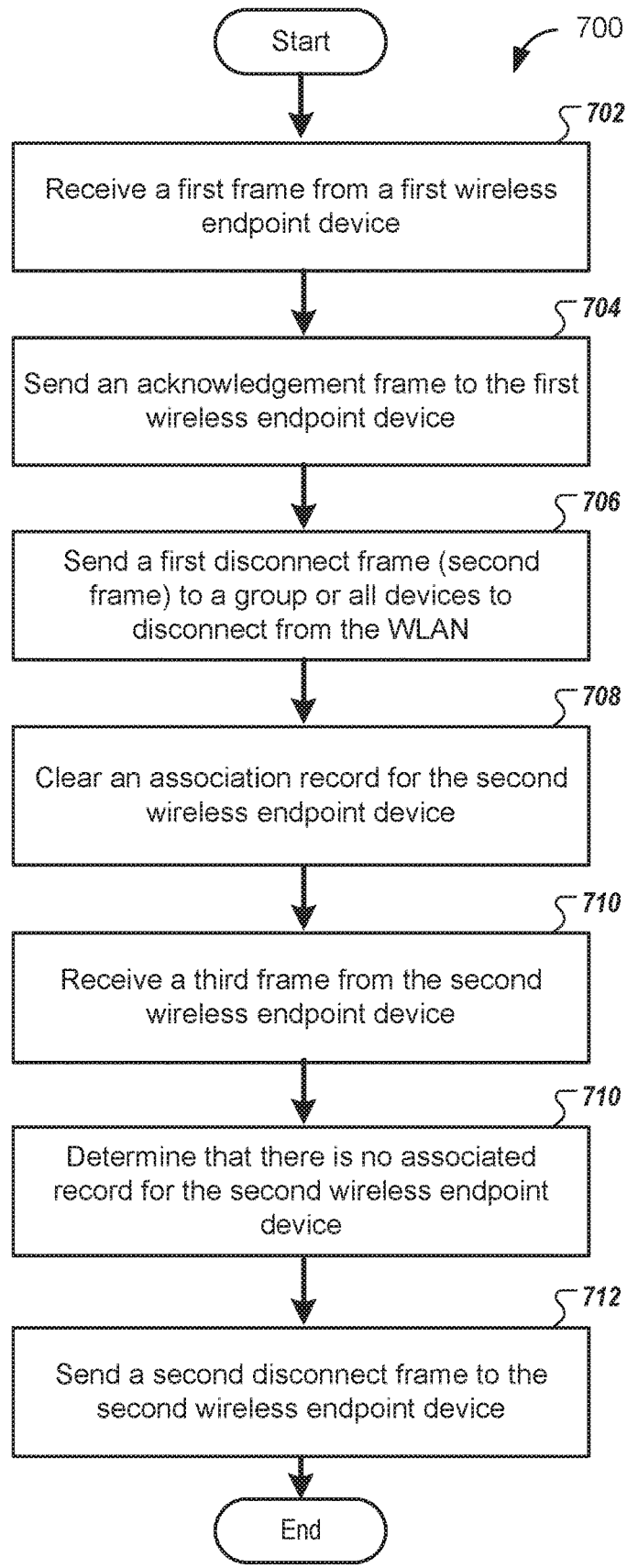
FIG. 7 is a flow diagram illustrating a method of handling a disconnect frame at a wireless access point device according to an embodiment.

FIG. 7 is a flow diagram illustrating a method 700 of handling a disconnect frame at a wireless access point device according to an embodiment. The method 700 may be performed by processing logic that comprises hardware (e.g., circuitry, dedicated logic, programmable logic, microcode, etc.), software, firmware, or a combination thereof. In one embodiment, method 700 may be performed by any of the wireless devices described herein and illustrated with respect to FIG. 1, 4, or 5.

Referring to FIG. 7, the method 700 begins by the processing logic receives a first frame from a first wireless endpoint device (block 702) and sends an acknowledgement frame to the first wireless endpoint device (block 704). The processing logic sends a first disconnect frame (second frame) to a group of two or more devices (multicast) or all devices (broadcast) that are part of the WLAN to disconnect all devices from the WLAN, including a second wireless endpoint device (block 706). The second frame can include a command to disconnect the second device from the WLAN. The processing logic clears an association record for at least the second wireless endpoint device (block 708). The association records for those devices that the WAP device wants to disconnect can be cleared. The association record can include first data that identifies the second device as being in an authorized state in which the first device is connected to the WLAN via the WAP device. The processing logic receives a third frame from the second wireless endpoint device. The processing logic determines that there is no association record for the second wireless endpoint device (block 710) and sends a second disconnect frame to the second wireless endpoint device (block 712), and the method 700 ends.

In a further embodiment, the first disconnect frame is a broadcast disconnect frame and the second disconnect frame is a unicast disconnect frame. The unicast disconnect frame is encrypted with an encryption key shared between the WAP device and the second wireless endpoint device.

In another embodiment, the processing logic receives a broadcast disconnect frame; That is, the destination address in the broadcast disconnect frame is addressed to all wireless endpoint devices in the wireless network. The processing logic determines that a source address of the broadcast disconnect frame matches an address of the WAP device. It should be noted that this is not possible as the AP cannot receive its own broadcast disconnect frame while transmitting broadcast disconnect frame. Also, the AP always knows when it has actually scheduled broadcast disconnect. The processing logic determines that the broadcast disconnect frame is non-authorized and originated from a third wireless endpoint device. The processing logic sends a third disconnect frame to the third wireless endpoint device. After the third wireless endpoint device is disconnected from the WAP device, the processing logic updates a group key and sends the group key to the wireless endpoint device that are still connected to the WAP device.

In another embodiment, the processing logic determines that the broadcast disconnect frame is a repeated non-authorized attempt by the third wireless endpoint device. The processing logic can add an identifier of the third wireless endpoint device to a blacklist. The blacklist is used to prevent the third wireless endpoint device from a subsequent connection to the wireless network.

In another embodiment, the processing logic receives a management frame from the first wireless endpoint device. The management frame includes a counter value indicating how many times a broadcast disconnect frame is received from a non-authorized device (i.e., a device that is not authorized to send the broadcast disconnect frame) by the first wireless endpoint device. The processing logic determines that the third wireless endpoint device is the non-authorized device and sends a third disconnect frame to the third wireless endpoint device. The processing logic updates a group key after the third wireless endpoint device is disconnected from the WAP device. The processing logic can send the updated group key to the wireless endpoint devices that are still connected to the WAP device.

Figure 8:
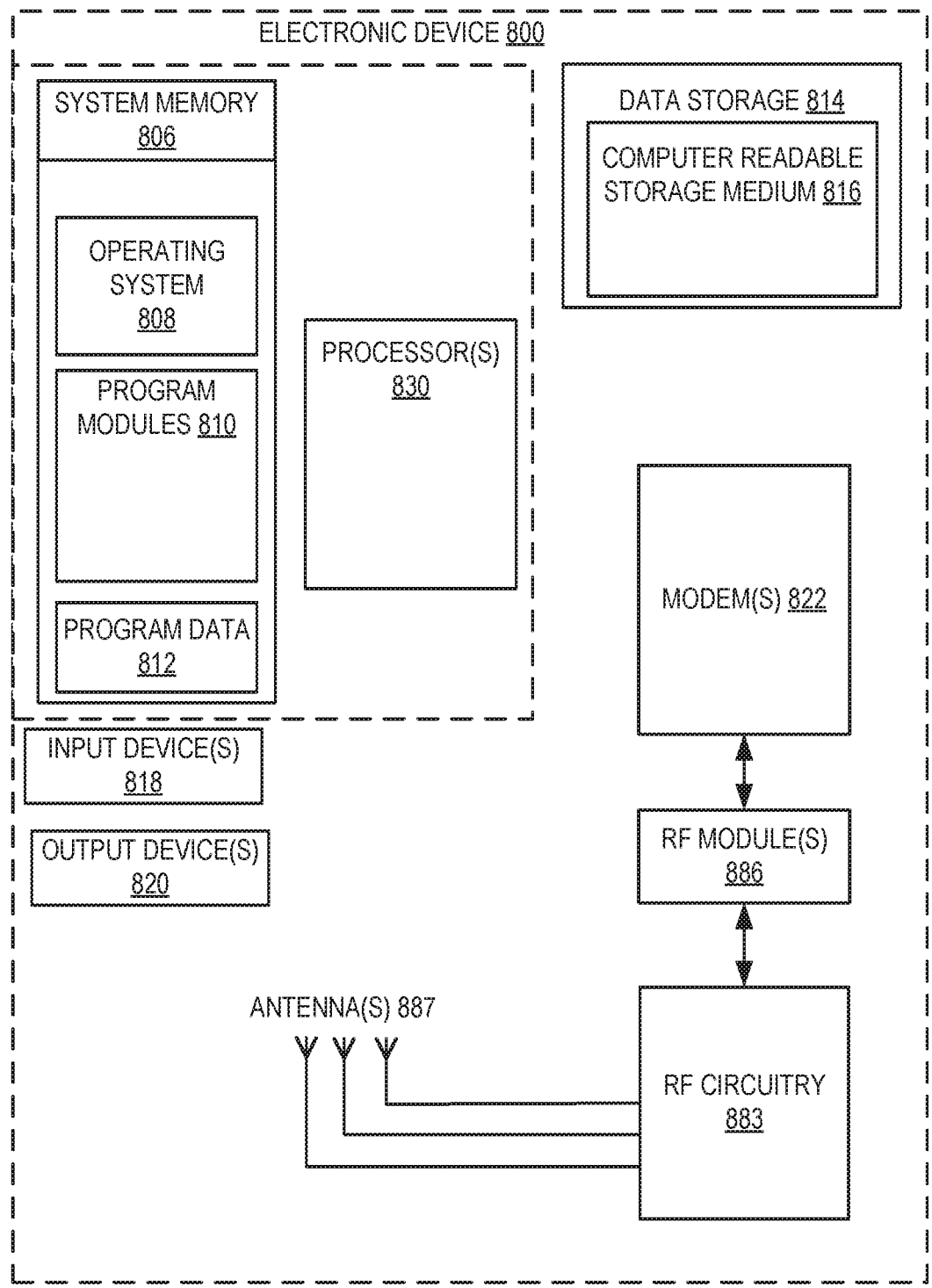
FIG. 8 is a block diagram of a wireless device according to one embodiment.

FIG. 8 is a block diagram of a wireless device 800 according to one embodiment. The wireless device 800 may correspond to the wireless devices described above with respect to FIGS. 1-7. Alternatively, the wireless device 800 may be other electronic devices as described herein.

The wireless device 800 includes one or more processor(s) 830, such as one or more CPUs, microcontrollers, field programmable gate arrays, or other types of processors. The wireless device 800 also includes system memory 806, which may correspond to any combination of volatile and/or non-volatile storage mechanisms. The system memory 806 stores information that provides operating system component 808, various program modules 810, program data 812, and/or other components. In one embodiment, the system memory 806 stores instructions of methods to control operation of the wireless device 800. The wireless device 800 performs functions by using the processor(s) 830 to execute instructions provided by the system memory 806.

The wireless device 800 also includes a data storage device 814 that may be composed of one or more types of removable storage and/or one or more types of non-removable storage. The data storage device 814 includes a computer-readable storage medium 816 on which is stored one or more sets of instructions embodying any of the methodologies or functions described herein. Instructions for the program modules 810 may reside, completely or at least partially, within the computer-readable storage medium 816, system memory 806 and/or within the processor(s) 830 during execution thereof by the wireless device 800, the system memory 806, and the processor(s) 830 also constituting computer-readable media. The wireless device 800 may also include one or more input devices 818 (keyboard, mouse device, specialized selection keys, etc.) and one or more output devices 820 (displays, printers, audio output mechanisms, etc.).

The wireless device 800 further includes a modem 822 to allow the wireless device 800 to communicate via a wireless connections (e.g., such as provided by the wireless communication system) with other computing devices, such as remote computers, an item providing system, and so forth. The modem 822 can be connected to one or more RF modules 886 that make up the two or more radios. The RF modules 886 may be a WLAN module, a WAN module, PAN module, GPS module, or the like. The antenna structures (antenna(s)) 887 are coupled to the RF circuitry 883, which is coupled to the modem 822. The RF circuitry 883 may include radio front-end circuitry, antenna switching circuitry, impedance matching circuitry, or the like. The antennas 887 may be WLAN antennas (such as the surface-link antennas described herein, GPS antennas, NFC antennas, other WAN antennas, WLAN or PAN antennas, or the like. The modem 822 allows the wireless device 800 to handle both voice and non-voice communications (such as communications for text messages, multimedia messages, media downloads, web browsing, etc.) with a wireless communication system. The modem 822 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 822 may generate signals and send these signals to antenna(s) 887 of a first type (e.g., WLAN 5 GHz), antenna(s) 885 of a second type (e.g., WLAN 2.4 GHz), and/or antenna(s) 887 of a third type (e.g., WAN), via RF circuitry 883, and RF module(s) 886 as descried herein. Antennas 887 may be configured to transmit in different frequency bands and/or using different wireless communication protocols. The antennas 887 may be directional, omnidirectional, or non-directional antennas. In addition to sending data, antennas 887 may also receive data, which is sent to appropriate RF modules connected to the antennas. One of the antennas 887 may be any combination of the antenna structures described herein.

In one embodiment, the wireless device 800 establishes a first connection using a first wireless communication protocol, and a second connection using a different wireless communication protocol. The first wireless connection and second wireless connection may be active concurrently, for example, if a wireless network device is receiving a media item from another wireless network device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the WMN and the second wireless connection may be associated with serving a content file to a client consumption device, as described herein.

Though a modem 822 is shown to control transmission and reception via antenna (887), the wireless device 800 may alternatively include multiple modems, each of which is configured to transmit/receive data via a different antenna and/or wireless transmission protocol.

In the above description, the embodiments of the surface-link antennas and antenna architectures may be used in a wireless network containing multiple network devices, organized in a network topology (e.g., AP-STA, Mesh, and Hybrid). The network devices in the wireless network cooperate in distribution of content files to client consumption devices in an environment of limited connectivity to broadband Internet infrastructure. The embodiments described herein may be implemented where there is the lack, or slow rollout, of suitable broadband Internet infrastructure in developing nations, for example. These wireless networks can be used in the interim before broadband Internet infrastructure becomes widely available in those developing nations. The wireless network devices are also referred to herein as mesh routers, mesh network devices, mesh nodes, Meshboxes, or Meshbox nodes, even when not used in mesh configurations. Multiple wireless network devices wirelessly are connected through a network backbone formed by multiple peer-to-peer (P2P) wireless connections (i.e., wireless connections between multiple pairs of the wireless network devices). The multiple network devices are wirelessly connected to one or more client consumption devices by node-to-client (N2C) wireless connections. The multiple network devices are wirelessly connected to a mesh network control service (MNCS) device by cellular connections. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multi-media content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, voice-controlled devices, and the like.

The embodiments of the wireless network devices may be used to deliver content, such as video, music, literature, or the like, to users who do not have access to broadband Internet connections because the mesh network devices may be deployed in an environment of limited connectivity to broadband Internet infrastructure. In some of the embodiments described herein, the mesh network architecture does not include "gateway" nodes that are capable of forwarding broadband mesh traffic to the Internet. The mesh network architecture may include a limited number of point-of-presence (POP) nodes that do have access to the Internet, but the majority of mesh network devices is capable of forwarding broadband mesh traffic between the mesh network devices for delivering content to client consumption devices that would otherwise not have broadband connections to the Internet. Alternatively, instead of POP node having access to broadband Internet infrastructure, the POP node is coupled to storage devices that store the available content for the WMN. The WMN may be self-contained in the sense that content lives in, travels through, and is consumed by nodes in the mesh network. In some embodiments, the mesh network architecture includes a large number of mesh nodes, called Meshbox nodes. From a hardware perspective, the Meshbox node functions much like an enterprise-class router with the added capability of supporting P2P connections to form a network backbone of the WMN. From a software perspective, the Meshbox nodes provide much of the capability of a standard content distribution network (CDN), but in a localized manner. The WMN can be deployed in a geographical area in which broadband Internet is limited. The WMN can scale to support a geographic area based on the number of mesh network devices, and the corresponding distances for successful communications over WLAN channels by those mesh network devices.

Although various embodiments herein are directed to content delivery, such as for the Amazon Instant Video (AIV) service, the WMNs, and corresponding mesh network devices, can be used as a platform suitable for delivering high bandwidth content in any application where low latency is not critical or access patterns are predictable. The embodiments described herein are compatible with existing content delivery technologies, and may leverage architectural solutions, such as CDN services like the Amazon AWS CloudFront service. Amazon CloudFront CDN is a global CDN service that integrates with other Amazon Web services products to distribute content to end users with low latency and high data transfer speeds. The embodiments described herein can be an extension to this global CDN, but in environments where there is limited broadband Internet infrastructure. The embodiments described herein may provide users in these environments with a content delivery experience equivalent to what the users would receive on a traditional broadband Internet connection. The embodiments described herein may be used to optimize deployment for traffic types (e.g. streaming video) that are increasingly becoming a significant percentage of broadband traffic and taxing existing infrastructure in a way that is not sustainable.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless endpoint device comprising:
   a wireless local area network (WLAN) radio; and
   a processor coupled to the WLAN radio, wherein the processor:
      receives a beacon frame or a probe response frame from a wireless access point (WAP) device via the WLAN radio, wherein the beacon frame or the probe response frame comprises first data indicating that the WAP device will not use a broadcast disconnect frame to disconnect devices from a WLAN, wherein the WAP device and the wireless endpoint device are part of the WLAN;
      receives a broadcast disconnect frame via the WLAN radio, wherein the broadcast disconnect frame comprises a source address that identifies the WAP device and a destination address that identifies that the broadcast disconnect frame is addressed to all wireless endpoint devices in the WLAN, wherein the broadcast disconnect frame is used to disconnect each of the wireless endpoint devices in the WLAN from the WLAN;
      determines, based on the first data, that the broadcast disconnect frame originates from a device that is not authorized to send the broadcast disconnect frame;
      maintains connection with the WLAN via the WAP device;
      increments a counter from a first value to a second value, wherein the counter tracks how many times a broadcast disconnect frame is received from the device that is not authorized to send the broadcast disconnect frame; and
      sends a management frame to the WAP device via the WLAN radio, wherein the management frame comprises the second value.

2. The wireless endpoint device of claim 1, wherein the management frame comprises third data indicating that the wireless endpoint device has a capability to discard the broadcast disconnect frame, wherein the processor sends the management frame responsive to receiving the first data.

3. The wireless endpoint device of claim 1, wherein the processor further:
responsive to receiving the broadcast disconnect frame:
sends a second frame to the WAP device after expiration of a configurable delay and while in an authorized state in which the wireless endpoint device is connected to the WLAN via the WAP device, wherein the configurable delay corresponds to an amount of time that allows the WAP device to clear an association record for the wireless endpoint device, wherein the association record comprises third data that identifies the wireless endpoint device as being in the authorized state;
receives an acknowledgment frame from the WAP device responsive to the second frame;
determines that no encrypted unicast disconnect frame is received from the WAP device within a second amount of time after sending the second frame to the WAP device; and
confirms that the broadcast disconnect frame originates from the device that is not authorized to send the broadcast disconnect frame;
receives a second broadcast disconnect frame via the WLAN radio, wherein the second broadcast disconnect frame comprises a source address that identifies the WAP device and a destination address that identifies that the second broadcast disconnect frame is addressed to all wireless endpoint devices in the WLAN; and
responsive to receiving the second broadcast disconnect frame:
sends a first frame to the WAP device after expiration of the configurable delay and while in the authorized state;
receives an encrypted unicast disconnect frame from the WAP device;
decrypts the encrypted unicast disconnect frame with an encryption key shared only between the WAP device and the wireless endpoint device; and
disconnects the wireless endpoint device from the WLAN.

4. A method comprising:
receiving, by a processor of a first device, a first frame comprising a command to disconnect the first device from a wireless network, wherein the first frame comprises: i) a source address of a wireless access point (WAP) device in the wireless network; and ii) a destination address that identifies that the first frame is addressed to all devices in the wireless network, wherein the first device and the WAP device are part of the wireless network;
sending, by the processor, a second frame to the WAP device responsive to the first frame after expiration of a configurable delay;
receiving, by the processor, an acknowledgment frame from the WAP device responsive to the second frame;
determining that the command to disconnect the first device from the wireless network is not received within a duration of time after sending the second frame to the WAP device; and
determining that the first frame originates from a second device that is not authorized to send the first frame responsive to the command to disconnect not being received within the duration of time, wherein the second device is part of the wireless network.

5. The method of claim 4, further comprising:
incrementing, by the processor, a first counter value to a second counter value, wherein the second counter value indicates how many times a frame including the command is received at the first device from any device that is not authorized to send the command;
sending, by the processor, a third frame to the WAP device, wherein the third frame comprises the second counter value; and
maintaining, by the processor, connection with the wireless network via the WAP device.

6. The method of claim 5, wherein sending the third frame comprises sending the third frame with the second counter value in a vendor element in the third frame or in an Extended Capabilities Information Element in the third frame.

7. The method of claim 4, further comprising receiving, by the processor, a third frame from the WAP device prior to receiving the first frame, wherein the third frame comprises first data indicating that the WAP device uses an encrypted unicast frame that includes the command to disconnect the first device from the wireless network.

8. The method of claim 7, further comprising:
incrementing, by the processor, a first counter value to a second counter value, wherein the second counter value indicates how many times a frame including the command is received at the first device from any device that is not authorized to send the command; and
sending, by the processor, a fourth frame to the WAP device, wherein the fourth frame comprises the second counter value, wherein the fourth frame comprises second data indicating that the first device has a capability to discard a frame that includes the command received from a device that is not authorized to send the frame that includes the command.

9. The method of claim 7, wherein receiving the third frame comprises receiving the third frame with the first data in a vendor element in the third frame or in an Extended Capabilities Information Element in the third frame.

10. The method of claim 4, further comprising:
receiving, by the processor, a third frame comprising a command to disconnect the first device from the wireless network, wherein the third frame is encrypted by an encryption key shared only between the WAP device and the first device;
decrypting, by the processor, the third frame using the encryption key; and
disconnecting, by the processor, the first device from the WAP device.

11. The method of claim 4, further comprising:
starting, by the processor, a timer with a timeout at an end of the duration of time, responsive to sending the second frame to the WAP device;
determining, by the processor, that the command to disconnect the first device from the wireless network is not received before the timeout;
determining, by the processor, that the first frame originates from the second device that is not authorized to send the first frame responsive to determining that the command is not received before the timeout; and
maintaining, by the processor, connection with the WAP device.

12. The method of claim 4, further comprising:
starting, by the processor, a timer with a timeout at an end of the duration of time, responsive to sending the second frame to the WAP device;
receiving, by the processor before the end of the duration of time, a third frame including the command to disconnect the first device from the wireless network, wherein the third frame is a unicast frame comprising a source address that identifies the WAP device;

determining, by the processor, that the third frame originates from the WAP device that is authorized to send the third frame comprising the command to disconnect; and disconnecting, by the processor, connection with the WAP device.

13. The method of claim 12, wherein the third frame is an encrypted frame, and wherein determining that the third frame originates from the WAP device comprises decrypting, by the processor, the encrypted frame using a key shared only between the WAP device and the first device.

14. The method of claim 12, wherein the first frame is encrypted with a first key shared between the WAP device and two or more devices that are part of the wireless network, and wherein the third frame is encrypted with a second key shared only between the WAP device and the first device.

15. The method of claim 5, further comprising:
determining, by the processor, that a first number of frames including the command to disconnect have been received within a first amount of time prior to receiving the first frame; and
determining, by the processor, that a receive signal strength indicator (RSSI) value measured for the first frame is within a range of RSSI values measured for each of the first number of frames.

16. A wireless access point (WAP) device of a wireless network, the WAP device comprising:
a wireless local area network (WLAN) radio; and
a processor coupled to the WLAN radio, wherein the processor is to:
receive a first frame from a first device in a WLAN, wherein the first device and the WAP device are part of the WLAN;
send an acknowledgement frame to the first device;
send a second frame to a second device, the second frame comprising a command to disconnect all devices from the WLAN;
clear an association record for the second device, wherein the association record comprises first data that identifies the second device as being in an authorized state in which the first device is connected to the WLAN via the WAP device;
receive a third frame from the second device;
determine that there is no association record for the second device responsive to receiving the third frame; and
send a fourth frame to the second device, the fourth frame comprising the command to disconnect the second device from the WLAN.

17. The WAP device of claim 16, wherein the first frame is a broadcast frame, and wherein the second frame is a unicast frame, wherein the unicast frame is encrypted with an encryption key shared only between the WAP device and the second device.

18. The WAP device of claim 16, wherein the processor is to:
receive a fifth frame including the command to disconnect from the WLAN;
determine that a source address of the fifth frame matches an address of the WAP device;
determine that the fifth frame originates from a third device that is not authorized to send the fifth frame including the command responsive to determining that the source address matches the address of the WAP device;
send a sixth frame to the third device; and
update a group key after the third device is disconnected from the WAP device.

19. The WAP device of claim 18, wherein the processor is to:
determine that the fifth frame is a repeated attempt by the third device; and
add an identifier of the third device to a blacklist, wherein the processor, using the blacklist, is to prevent the third device from a subsequent connection to the wireless network.

20. The WAP device of claim 18, wherein the processor is to:
receive a seventh frame from the first device, wherein the seventh frame comprises a counter value indicating how many times a frame including a command is received by the first device and the frame originates from a device that is not authorized to send the frame including the command;
determine that the frame including the command originates from the third device that is not authorized to send the frame including the command;
send an eighth frame to the third device, the eighth frame comprising the command to disconnect the third device from the WAP device; and
update a group key after the third device is disconnected from the WAP device.

* * * * *